United States Patent

Mehrkens et al.

[11] Patent Number: 5,797,647
[45] Date of Patent: Aug. 25, 1998

[54] VEHICLE BODY

[75] Inventors: Sigrid Mehrkens, Königsbach-Stein; Friedhelm Söffge, Leonberg; Michael Preiss, Vaihingen, all of Germany

[73] Assignee: Dr. Ing. h.c.F. Porsche AG

[21] Appl. No.: 706,942

[22] Filed: Sep. 3, 1996

[30] Foreign Application Priority Data

Sep. 2, 1995 [DE] Germany .................. 195 32 531.1
Feb. 22, 1996 [DE] Germany .................. 196 06 506.2

[51] Int. Cl.⁶ .................................................. B62D 21/00
[52] U.S. Cl. ....................... 296/204; 180/68.1; 180/311
[58] Field of Search .................................. 280/785, 788; 180/68.1, 311, 312; 296/195, 203, 204

[56] References Cited

U.S. PATENT DOCUMENTS

| 2,194,394 | 3/1940 | Klavik ............................. 180/68.1 |
| 2,232,275 | 2/1941 | Ronning ........................... 280/271 |
| 3,309,759 | 3/1967 | Vittone ............................. 280/781 |
| 3,409,098 | 11/1968 | Brueder . | |

FOREIGN PATENT DOCUMENTS

| 147843 | 11/1936 | Austria . | |
| 0274993A1 | 7/1988 | European Pat. Off. . | |
| 285131 | 10/1988 | European Pat. Off. ........... 296/204 |
| 0291650A1 | 11/1988 | European Pat. Off. . | |
| 603574 | 6/1994 | European Pat. Off. ........... 280/785 |
| 3026876A1 | 2/1982 | Germany . | |
| 4244216A1 | 6/1994 | Germany . | |
| 4244217A1 | 6/1994 | Germany . | |
| 4318226A1 | 12/1994 | Germany . | |
| 230827 | 4/1944 | Switzerland ....................... 180/68.1 |

*Primary Examiner*—Sherman Basinger
*Attorney, Agent, or Firm*—Evenson McKeown Edwards & Lenahan, PLLC

[57] ABSTRACT

A vehicle body comprises elements which are connected in a reinforcing manner with side rails of the body and consist of two struts which taper in a V-shaped manner toward the vehicle rear. These are connected with one another by at least one cross member. The free ends of the V-shaped struts are connected with a one-piece carrier plate which comprises two trapezoidal segments connected with one another by way of an integrated cross member. One trapezoidal segment has profiled lateral edges which extend as a lengthening of the V-shaped struts.

21 Claims, 5 Drawing Sheets

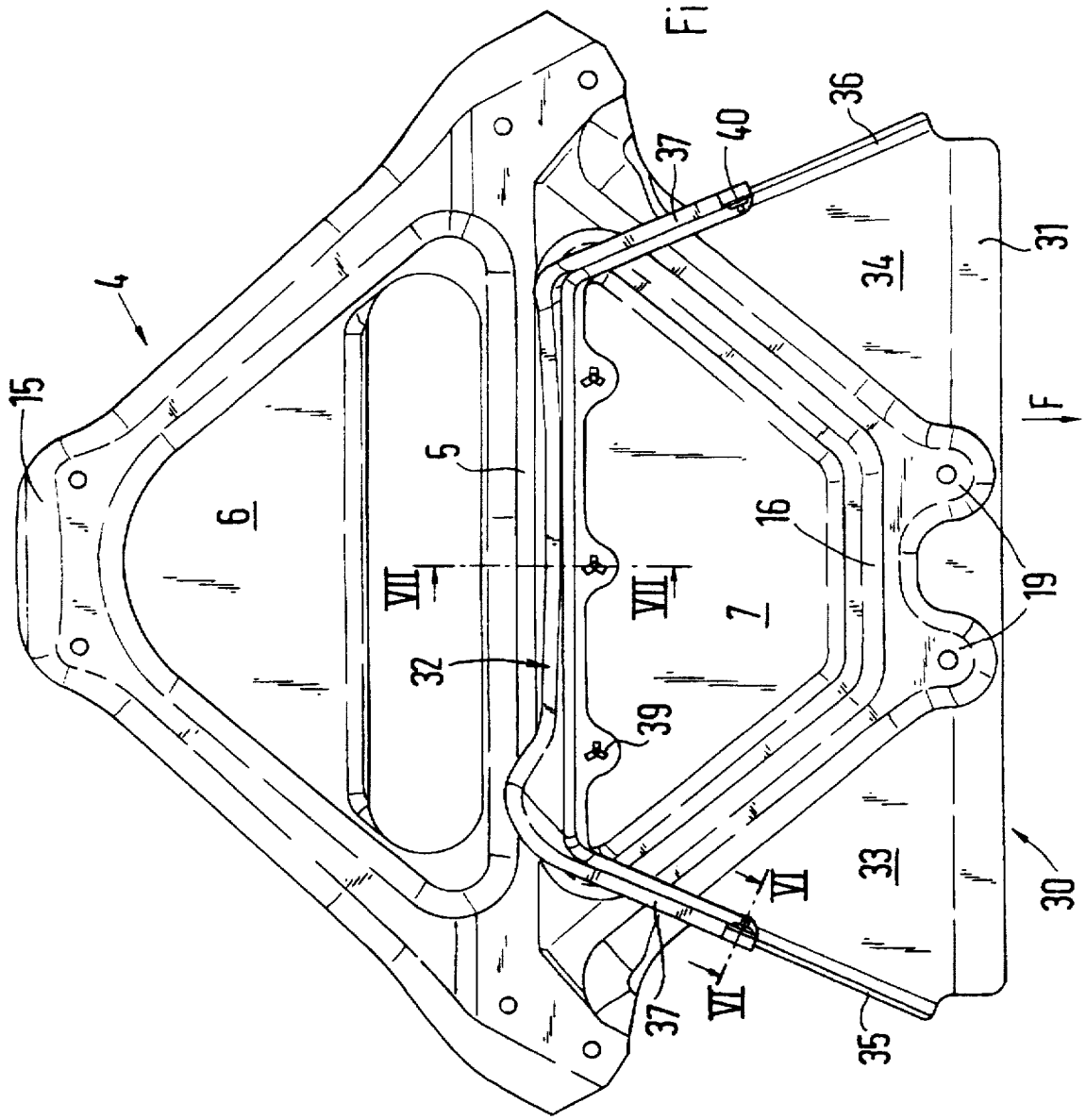

VEHICLE BODY

BACKGROUND AND SUMMARY OF THE INVENTION

This invention relates to a vehicle body which comprises elements which are connected with side rails of the body in a reinforcing manner.

From German Patent Document DE 42 44 216 A1, a vehicle body is known which has V-shaped struts which are connected on one side with side rails and on the other side with a rear-side and vertically applied transverse support. Furthermore, a vehicle body is known from German Patent Document DE 42 44 217 A1 which has a plate which is connected with the side rails and is used for reinforcing the body.

It is an object of the invention to provide an improved vehicle body which is torsion-proof, saves weight, is easy to mount and ensures a secure linking of the wheel suspension to the vehicle body. Furthermore, a targeted heat dissipation is to be achieved from the transmission or from the drive assembly.

This object is achieved by means of a vehicle body of the above-noted type, wherein the free ends of the V-shaped struts are connected with a one-piece carrier plate which comprises two trapezoidal segments which are connected with one another by way of an integrated cross member, one of said segments having profiled side edges which extend as a lengthening of the V-shaped struts.

In the case of vehicles with an open construction, such as convertibles, it was found that the vehicle body is subjected to high torsional loads. In order to prevent this, V-shaped struts are known which are connected with the side rails of the vehicle body and meet in the vehicle rear and are fastened on a transverse support. Because of the many parts of such a known reinforcement by means of struts, its mounting requires relatively high expenditures and an occurring torsion as well as transversely directed displacements of a linked side member for receiving a wheel suspension cannot be sufficiently absorbed. In the driving operation, the displacements of the side member are essentially the result of lateral forces exercised on the wheel which load the side member by way of the wheel suspension control arms.

For eliminating these defects, instead of the known struts in the rear area of the vehicle body, a one-piece carrier plate is provided which adjoins the struts directly. On its forward and rearward ends, it is, in each case, connected with a cross member or a support of the vehicle body and, in the area of the linking to the free ends of the struts, an integrated cross member is provided which is formed by the plate and which is simultaneously connected with the side member. The wheel suspension control arms for the wheel suspension are supported therein. The carrier plate consists essentially of a metal sheet formed in one piece which has profiled depressions in the form of creases with a U-shaped cross-section on the edge. These creases extend along the whole circumference of the plate and also form the cross member.

The shape of the carrier plate is such that the V-shaped struts are lengthened by the profiled edges constructed as creases and end in the vertical transverse support arranged on the rear side. The plate comprises two trapezoidal surface parts which are connected with one another by way of the cross member.

For the simple connection of the one-piece carrier plate, respective plane connection surfaces are provided in the web of the creases in the connection areas with the transverse member, the transverse support and the struts.

In the carrier plate, a transversely extending breakthrough is provided which is used for the unhindered arrangement of a stabilizer arranged between the two rear wheels. Another opening is used for the accessibility of a transmission oil drain screw.

The carrier plate achieves a so-called pushing function which, in addition to avoiding a torsion of the vehicle body, also prevents a transverse displacement of the side member accommodating the wheel suspension. Furthermore, in the area of the drive assembly, the underbody is covered so that it is essentially protected.

According to another feature of preferred embodiments of the invention, the air guiding element advantageously consists of a metal sheet forming air guiding ducts which has channel-type molded-out areas on each side of a longitudinal center axis of the vehicle. A lateral bounding of the air guiding element takes place by way of raised outer edges. The upward air deflection toward the transmission takes place by way of a deflecting shell which adjoins the air guiding element and which also has a raised edge.

This air guiding element with the deflecting shell forces the air approaching against the driving direction to the transmission case of the drive assembly and cools it by a heat dissipation by way of the air current. The contour of the transversely disposed raised edge is selected to be such that the transmission case must be arranged correspondingly. The corner edges of the raised edge are pulled up or extended so that the air current can be guided correspondingly.

Other objects, advantages and novel features of the present invention will become apparent from the following detailed description of the invention when considered in conjunction with the accompanying drawings.

BRIEF DESCRIPTION OF THE DRAWINGS

FIG. 5 is a diagrammatic representation of the metal carrier plate with the air guiding device of FIG. 4;

FIG. 6 is a sectional view taken along Line VI—VI of FIG. 5 of a connection point between the air guiding element and a deflecting shell;

FIG. 7 is a sectional view taken along Line VII—VII of FIG. 5 of a connection point between the deflecting shell and the carrier plate; and FIG. 8 is a sectional view taken along Line VIII—VIII of FIG. 4 a duct-type air inlet between the air guiding device and a body-side cross member.

DETAILED DESCRIPTION OF THE DRAWINGS

Figure 1:
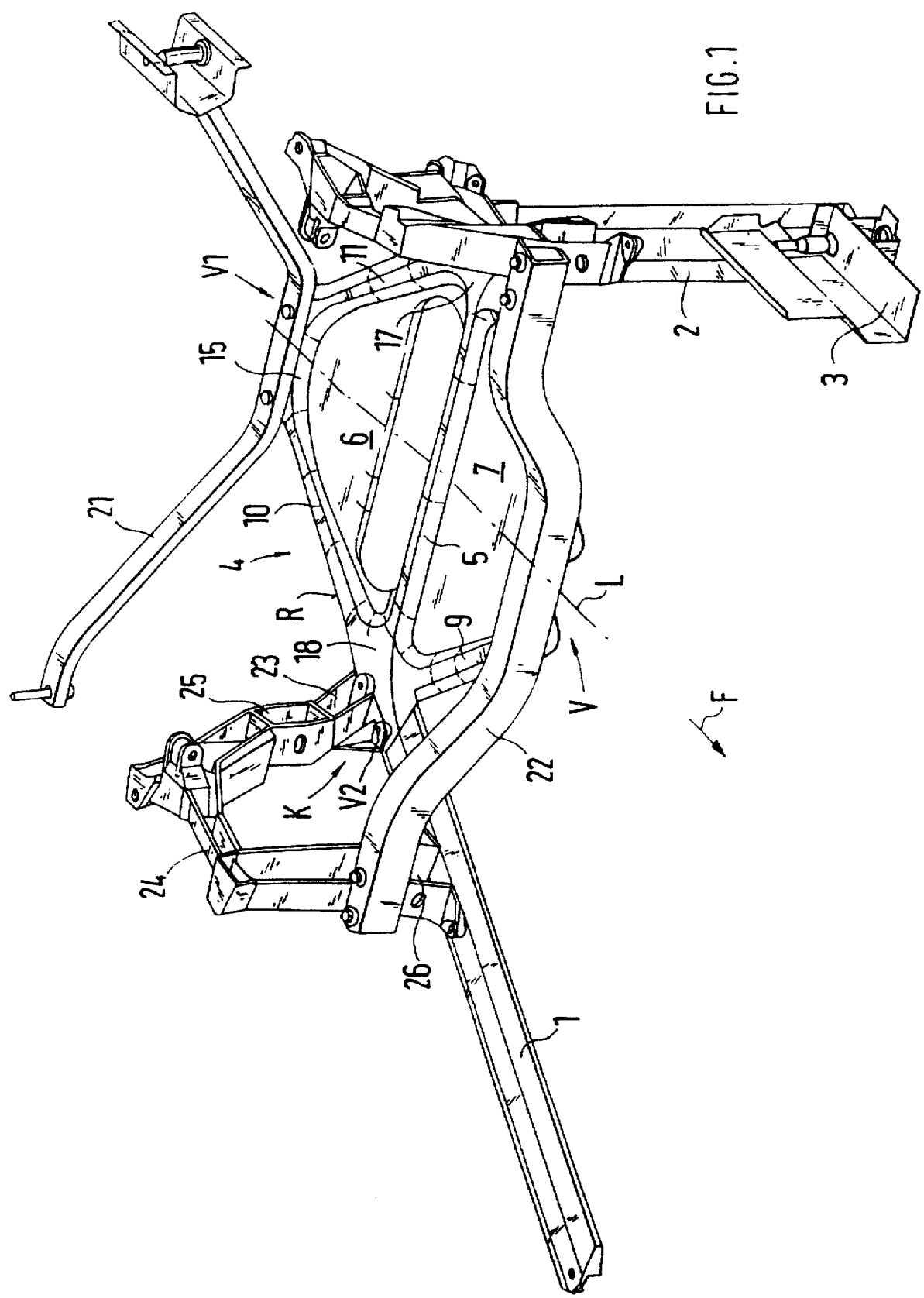
FIG. 1 is a diagrammatic representation of an installed carrier plate in a vehicle body constructed according to a preferred embodiment of the invention.

The vehicle body of a motor vehicle comprises in the rear area, as illustrated in detail in FIG. 1, two struts 1, 2 set in a V-shape which are connected on one side with side rails 3 and are connected on the other side with their free ends with a carrier plate 4.

The carrier plate 4 consists of two trapezoidal segments 6, 7 which have a cross member 5. These segments 6, 7 have profiled sections 8, 9 and 10, 11 which extend around on the edge R, which have a U-shaped cross-section and form creases. Correspondingly the cross member 5 is also constructed as a crease 12. Between the creases 8, 9 and 10, 11, the carrier plate 4 is constructed as a sheet metal part with plate surfaces 13, 14. The creases 8, 9 of the segment 7 are connected with one another by way of a crease 16 situated in parallel with respect to the cross member 5, and the creases 10, 11 of the segment 6 are connected with one another by way of a crease 15 situated in parallel to the cross member 5.

In the web of the creases 15, 16 as well as in the transition area between the creases 8 and 11 as well as 9 and 10, the carrier plate 4 has plane connection surfaces 19, 20 and 17, 18. By way of the connection surface 20 in the web of the crease 15, a rear-side connection V1 takes place of the carrier plate 5 with a vertically aligned transverse support 21. A connection of the cross member 22 with the carrier plates takes place by way of the connection surface 19.

The connection V2 of the carrier plate 4 with the struts 1, 2 takes place by way of the plane connection surfaces 17, 18. Simultaneously, a foot 23 of a side member 24 is fastened in this connection node K. This side member 24 has receiving devices 25, 26 for bearings of wheel suspension control arms.

A breakthrough 27 as well as an opening 28 are provided in the segment 6. The breakthrough 27 is used for the unhindered arrangement of a transversely extending stabilizer, and the opening 28 is provided for the accessibility to a transmission oil screw.

Figure 2:
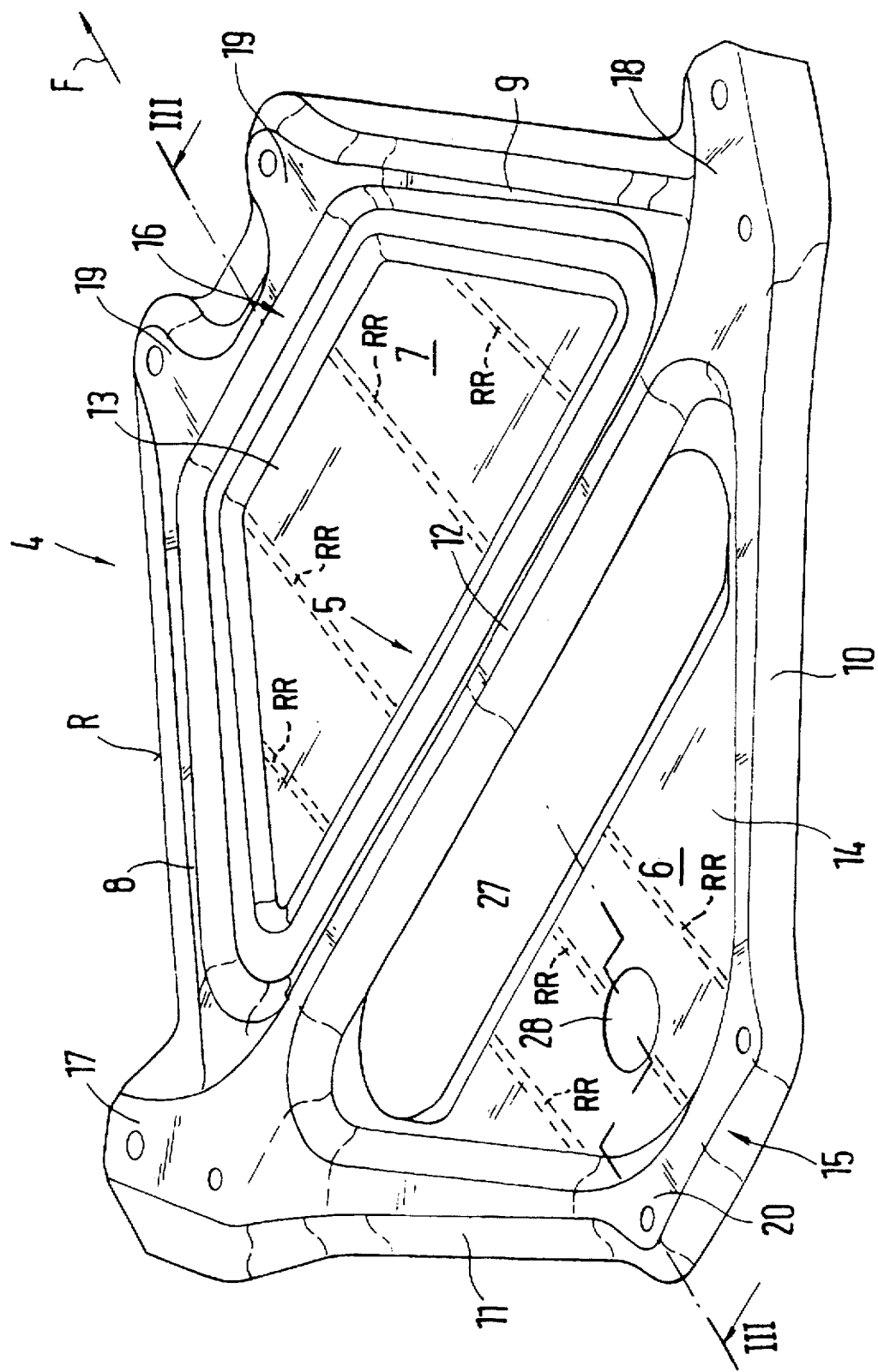
FIG. 2 is a diagrammatic representation of the one-piece carrier plate of FIG. 1.
Figure 3:
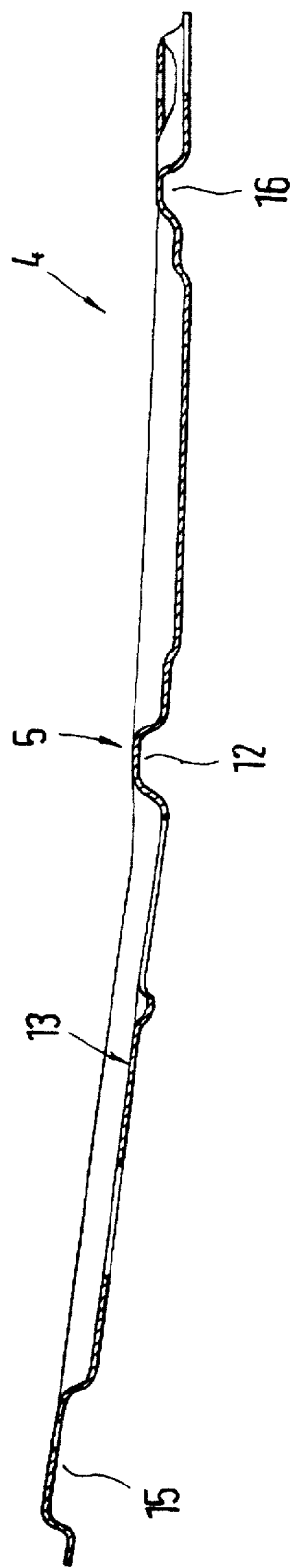
FIG. 3 is a sectional view taken along Line III—III of FIG. 2 of the carrier plate.

The plate surfaces 13, 14 of the segments 6, 7 between the creases can be reinforced with longitudinally, transversely or diagonally arranged reinforcing ribs RR which are schematically shown in dash line in FIG. 2. Furthermore, for the cooling or for the dissipation of heated air, correspondingly constructed openings or air outlets can be provided in these surface sections 13, 14.

According to another embodiment according to FIGS. 4 to 8, the carrier plate 4 essentially comprises an air guiding device 30 which consists of an air guiding element 31 and a deflecting shell 32.

The air guiding element 31 is preferably constructed in one piece with the carrier plate 4 and directly adjoins the segment 7. Between the segment 7 and the element 31, duct-type air inlets 33, 34 are formed on both sides of a longitudinal center axis X—X of the vehicle by means of molded-out sections in the carrier plate 4 of the segment 7. On the exterior edges, the air guiding element 31 is provided with raised edges 35, 36.

In the area of the cross member 5 of the plate 4, the deflecting shell 32 is arranged in a transversely extending manner and has a continuous raised edge 37. The edge 37 directly adjoins the edge 35 of the air guiding element 31.

Figure 4:
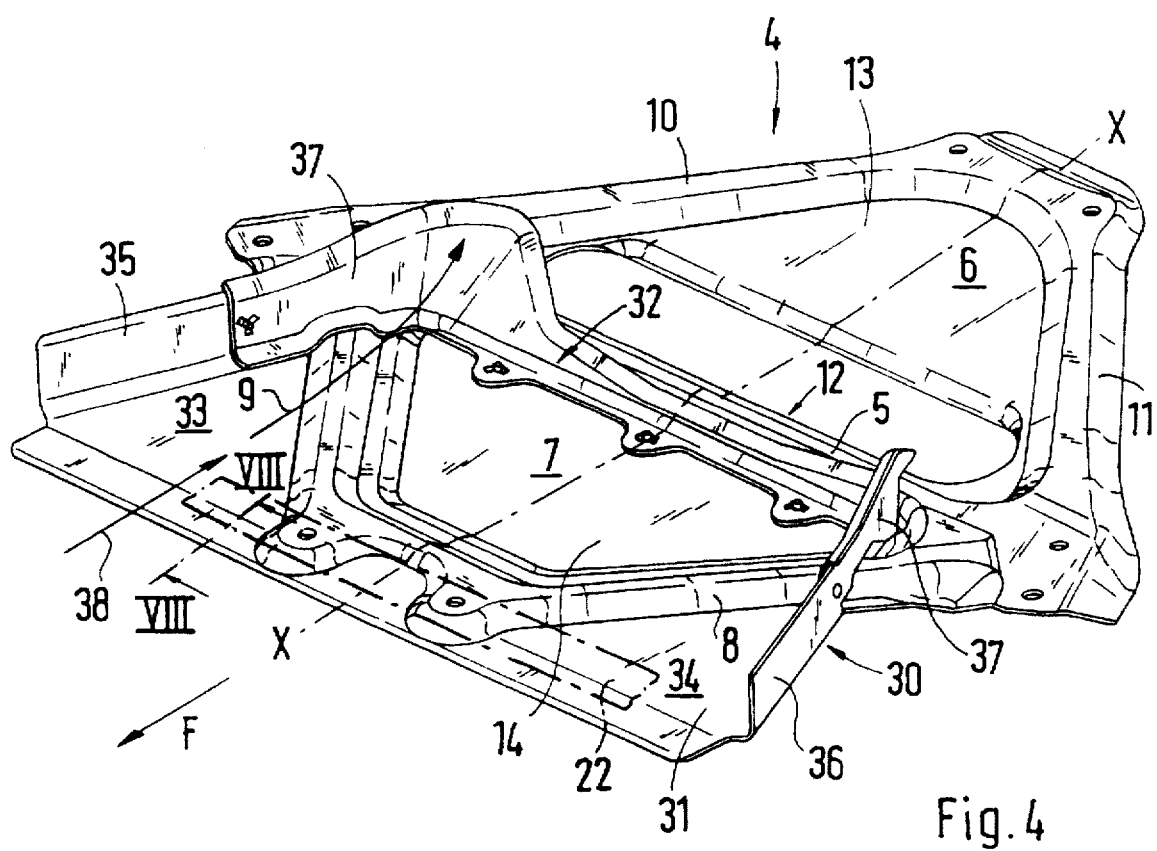
FIG. 4 is a top view of a metal carrier plate with an air guiding device, constructed according to preferred embodiments of the invention.

As illustrated in detail in FIG. 4, the air inlet is designed in the shape of a funnel by way of the air guiding element 31 so that the flowing-in air is forced in the direction of the arrow 38 to the deflecting element 32 and is guided from there by way of the raised edge 37 to the transmission case.

By way of rivetings 39, 40 or the like, the deflecting element 32 is connected with the carrier plate 4 and the air guiding element 30, as illustrated in detail in FIGS. 4 to 6.

In the driving operation, the air flows against the driving direction F in the direction of the arrow 38 between the cross member 22 and the bottom surface 41 of the air guiding element 31 to the deflecting element 32. From here, the air is deflected and will then flow against the transmission case which approximately has its separation to the engine in the area of the cross member 22. By means of this targeted guiding of the air, a heat buildup between the carrier plate 4 and the drive assembly, particularly the transmission, is avoided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle body comprising elements connected with side rails of the body in a reinforcing manner, which elements consist of two struts which taper in a V-shape toward the rear of the vehicle and which are connected with one another by way of at least one cross member, wherein free ends of the V-shaped struts are connected with a one-piece carrier plate which comprises two trapezoidal segments which are connected with one another by way of an integrated cross member, one of said segments having profiled side edges which extend as a lengthening of the V-shaped struts.

2. Vehicle body according to claim 1, wherein the carrier plate is connected by way of:

at least one forward connection point which is situated in the longitudinal axis of the vehicle and with respect to the forward driving direction, is in front on a cross member, another rearward connection point at a vertically aligned transverse support fastened to the vehicle body, and intermediate connections with the respective free ends of the V-shaped struts in a node with a side member receiving vehicle wheel suspension control arms.

3. Vehicle body according to claim 2, wherein one of the trapezoidal segments is connected by way of at least one fastening with the vertical transverse support, and wherein the other trapezoidal segment is connected by way of at least one additional fastening with the cross member.

4. Vehicle body according to claim 3, wherein the carrier plate consists of a one-piece sheet metal part with profiled sections which are provided in plate surfaces of the carrier plate and which form the integrated cross member as well as the edges in a surrounding manner.

5. Vehicle body according to claim 4, wherein the carrier plate has a breakthrough as well as an opening in one of the trapezoidal segments between the profiled sections.

6. Vehicle body according to claim 4, wherein the carrier plate has plane connection surfaces which are provided in webs of the profiled sections for the connection with the cross member, the transverse support and the struts.

7. Vehicle body according to claim 6, wherein the carrier plate has a breakthrough as well as an opening in one of the trapezoidal segments between the profiled sections.

8. Vehicle body according to claim 7, wherein reinforcing ribs are arranged in the plate surfaces of the segments between the profiled sections.

9. Vehicle body according to claim 8, wherein at least one air opening is arranged in at least one plate surface of the trapezoidal segments.

10. Vehicle body according to claim 4, wherein at least one air opening is arranged in at least one plate surface of the trapezoidal segments.

11. Vehicle body according to claim 2, wherein at least one air opening is arranged in at least one plate surface of the trapezoidal segments.

12. Vehicle body according to claim 1, wherein the carrier plate consists of a one-piece sheet metal part with profiled sections which are provided in plate surfaces of the carrier plate and which form the integrated cross member as well as the edges in a surrounding manner.

13. Vehicle body according to claim 12, wherein the carrier plate has a breakthrough as well as an opening in one of the trapezoidal segments between the profiled sections.

14. Vehicle body according to claim 12, wherein reinforcing ribs are arranged in the plate surfaces of the segments between the profiled sections.

15. Vehicle body according to claim 1, wherein at least one air opening is arranged in at least one plate surface of the trapezoidal segments.

16. Vehicle body comprising elements connected with side rails of the body in a reinforcing manner, which elements include two struts which taper in a V-shape toward the rear of the vehicle and which are connected with one another by way of at least one cross member, wherein a carrier plate connected with rear ends of the struts has an air guiding device which adjoins a forward segment of the carrier plate and consists of a molded-on air guiding element with an adjoining deflecting shell.

17. Vehicle body according to claim 16, wherein the air guiding element has on both sides of a longitudinal center axis of the vehicle, one duct-type air inlet respectively, which on a lateral outer side is in each case bounded by a raised edge, and which directly adjoins the deflecting shell.

18. Vehicle body according to claim 17, wherein the deflecting shell has a continuous raised edge which is constructed as a lengthening of the edge of the air guiding element.

19. Vehicle body according to claim 17, wherein raised edges of the air guiding element and of the deflecting shell form a funnel-shaped air inlet for achieving a forced air supply to a transmission of a drive assembly.

20. Vehicle body according to claim 16, wherein the deflecting shell has a continuous raised edge which is constructed as a lengthening of an edge of the air guiding element.

21. Vehicle body according to claim 16, wherein the deflecting shell is connected with the carrier plate and the air guiding element by means of connection elements.

* * * * *